United States Patent
Obayashi

(10) Patent No.: US 8,169,183 B2
(45) Date of Patent: May 1, 2012

(54) ELECTRIC POWER SUPPLY SYSTEM AND VEHICLE

(75) Inventor: Kazuyoshi Obayashi, Chita-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 193 days.

(21) Appl. No.: 12/451,241

(22) PCT Filed: Apr. 18, 2008

(86) PCT No.: PCT/JP2008/058007
§ 371 (c)(1),
(2), (4) Date: Nov. 2, 2009

(87) PCT Pub. No.: WO2008/142952
PCT Pub. Date: Nov. 27, 2008

(65) Prior Publication Data
US 2010/0090524 A1    Apr. 15, 2010

(30) Foreign Application Priority Data
May 17, 2007  (JP) ................. 2007-131243

(51) Int. Cl.
H02J 7/14    (2006.01)
H02J 7/00    (2006.01)
B60K 6/20    (2007.10)
B60W 10/30   (2006.01)

(52) U.S. Cl. ........ 320/104; 320/132; 320/128; 903/903; 903/907; 180/65.21; 180/65.27; 180/65.31

(58) Field of Classification Search ............... 320/104
See application file for complete search history.

(56) References Cited

U.S. PATENT DOCUMENTS 5,686,812 A    11/1997  Hotta
7,413,827 B2 *  8/2008  Inui .................. 429/62
(Continued)

FOREIGN PATENT DOCUMENTS

JP    A-06-141488    5/1994
(Continued)

OTHER PUBLICATIONS

International Preliminary Report on Patentability issued in International Application No. PCT/JP2008/058007 on Nov. 24, 2009 (with English-language translation).

(Continued)

*Primary Examiner* — Edward Tso
*Assistant Examiner* — Ahmed Omar
(74) *Attorney, Agent, or Firm* — Oliff & Berridge, PLC

(57) ABSTRACT

An electric automobile has a battery and also has a travel motor and a vehicle interior load device which operate using electric power from the battery. In response to a request for a start of electric power supply to the vehicle interior load device with the automobile being at a standstill, the electric automobile determines, based on the charged state of the battery, whether electric power from the battery can be supplied to the vehicle interior load device. When determining that the electric power from the battery cannot be supplied to the vehicle interior load device, the electric automobile makes a request to an electric power supply device to supply electric power to the vehicle interior load device. In response to the request, the electric power supply device electrically connects to the vehicle interior load device and starts supply of electric power to the vehicle interior load device.

1 Claim, 8 Drawing Sheets

U.S. PATENT DOCUMENTS 7,839,020 B2 * 11/2010 Nakanishi ................... 307/65
2008/0067974 A1 * 3/2008 Zhang et al. ................ 320/104

FOREIGN PATENT DOCUMENTS

| JP | A-08-126120 | 5/1996 |
| JP | A-08-214411 | 8/1996 |
| JP | A-2000-078701 | 3/2000 |
| JP | A-2001-008380 | 1/2001 |
| JP | A-2001-258177 | 9/2001 |
| JP | A-2002-315193 | 10/2002 |
| JP | A-2006-057583 | 3/2006 |

OTHER PUBLICATIONS

Japanese Office Action issued in Japanese Patent Application No. 2007-131243 on Aug. 4, 2009. (with English-language translation).
International Search Report issued in PCT/JP2008/058007 on Jul. 22, 2008.

* cited by examiner

ELECTRIC POWER SUPPLY SYSTEM AND VEHICLE

TECHNICAL FIELD

The present invention relates to a system for controlling electric power of a vehicle.

BACKGROUND ART

As electric vehicles such as electric automobiles use electric motors as power sources for driving by receiving electric power supplied from batteries, the batteries must be charged when the charged amount is depleted.

Generally, a battery for an electric vehicle needs to be charged after several tens of hours of traveling. Further, a battery naturally discharges electricity even if it is not used. As such, when an electric vehicle has not been used for a long time, as the battery capacity is reduced although it was fully charged, the battery may be required to be charged even if the vehicle has not been traveling.

Patent Document 1 discloses an art to calculate expected electric power usage according to schedules such as a distance and time to be used, and compare the expected electric power usage with the residual of the current charged amount of the battery to thereby determine whether or not charging is required.

Patent Document 2 discloses an art to automatically charge a battery when the residual capacity of the battery is reduced after an ignition switch was turned off.

Patent Documents 3 and 4 disclose an art enabling transmission of electric power between an electric automobile and a home. More specifically, Patent Documents 3 and 4 disclose an art to learn power consumption according to a traveling history, calculate an amount of secured electric power which is required to be secured for a battery, and supply power from the battery to the home side while limiting to a range in which the amount of secured electric power and the amount of electric power for emergency use are subtracted from the residual amount of the battery.

PATENT DOCUMENT 1: JP 2002-315193 A
PATENT DOCUMENT 2: JP 8-126120 A
PATENT DOCUMENT 3: JP 2001-8380 A
PATENT DOCUMENT 4: JP 2001-258177 A

DISCLOSURE OF THE INVENTION

Problems to be Solved by the Invention

A vehicle such as an automobile may activate an air-conditioning device before the ignition switch is turned on with use of electric power of a battery to thereby previously control the heat environment inside the vehicle to be in a desired state by the time that the vehicle is used. Further, until the ignition switch is turned on, the battery of the electric automobile may supply remaining electric power to a home side for example, as disclosed in Patent Documents 3 and 4. When the electric power of the battery is consumed by a load such as an air-conditioning device before the vehicle is used, if the power consumption of the load is large, the residual capacity of the battery may not be sufficient for traveling of the vehicle when the vehicle starts traveling, even though the power consumption has been estimated and the electric power has been secured.

An object of the present invention is to prevent the residual capacity of a battery provided to a vehicle from being deficient in necessary capacity at least when the vehicle starts operation.

Means for Solving the Problems

The present invention is an electric power supply system including a vehicle having a vehicle interior load device which operates by electric power from a battery, and an electric power supply device for charging the battery with use of electric power from a commercial electric power source system. The vehicle includes an electric power supply requesting section which makes a request to the electric power supply device to supply electric power to the vehicle interior load device in accordance with a demand for supplying electric power to the vehicle interior load device when the vehicle is at a standstill, and an electric power reception section which is connected to the vehicle interior load device and receives electric power supplied from the electric power supply device and supplies the electric power to the vehicle interior load device in accordance with the request. The electric power supply device includes an electric power supply section which is connected to the electric power reception section by means of an inductive method or a conductive method, and supplies electric power to the electric power reception section, in accordance with the request.

Further, the present invention is a vehicle including a vehicle interior load device which operates by electric power from a battery. The vehicle includes an electric power requesting section which makes a request to an electric power supply device for charging the battery using electric power from a commercial electric power source system to supply electric power to the vehicle interior load device in accordance with a demand for supplying electric power to the vehicle interior load device when the vehicle is at a standstill, and an electric power reception section which is connected to the vehicle interior load device and receives electric power supplied from the electric power supply device and supplies the electric power to the vehicle interior load device in accordance with the request.

Further, the present invention is an electric power supply system including a vehicle having an electric power generation device or a battery, and an electric power supply device which supplies electric power generated by the electric power generation device or electric power stored in the battery to an electric load outside the vehicle. The electric power supply device includes a requesting section which makes a request to the vehicle to supply electric power to the electric load in accordance with a demand for starting electric power supply from the battery to the electric load, and an electric power reception section which, upon receiving from the vehicle a determination result that electric power can be supplied from the battery in response to the request, connects to the vehicle by means of an inductive method or a conductive method and supplies the electric power from the battery to the electric load. The vehicle includes a determination section which determines whether or not the electric power from the battery can be supplied to the electric load based on a state of charge of the battery and outputs a determination result to the electric power supply device in response to the request, and an electric power supply section which connects to the electric power reception section of the electric power supply device by means of an inductive method or a conductive method and supplies the electric power from the battery to the electric power reception section.

Advantages of the Invention

According to the present invention, it is possible to prevent deficiency in the residual capacity of the battery provided to the vehicle, at least when the vehicle starts operation.

Figure 1:
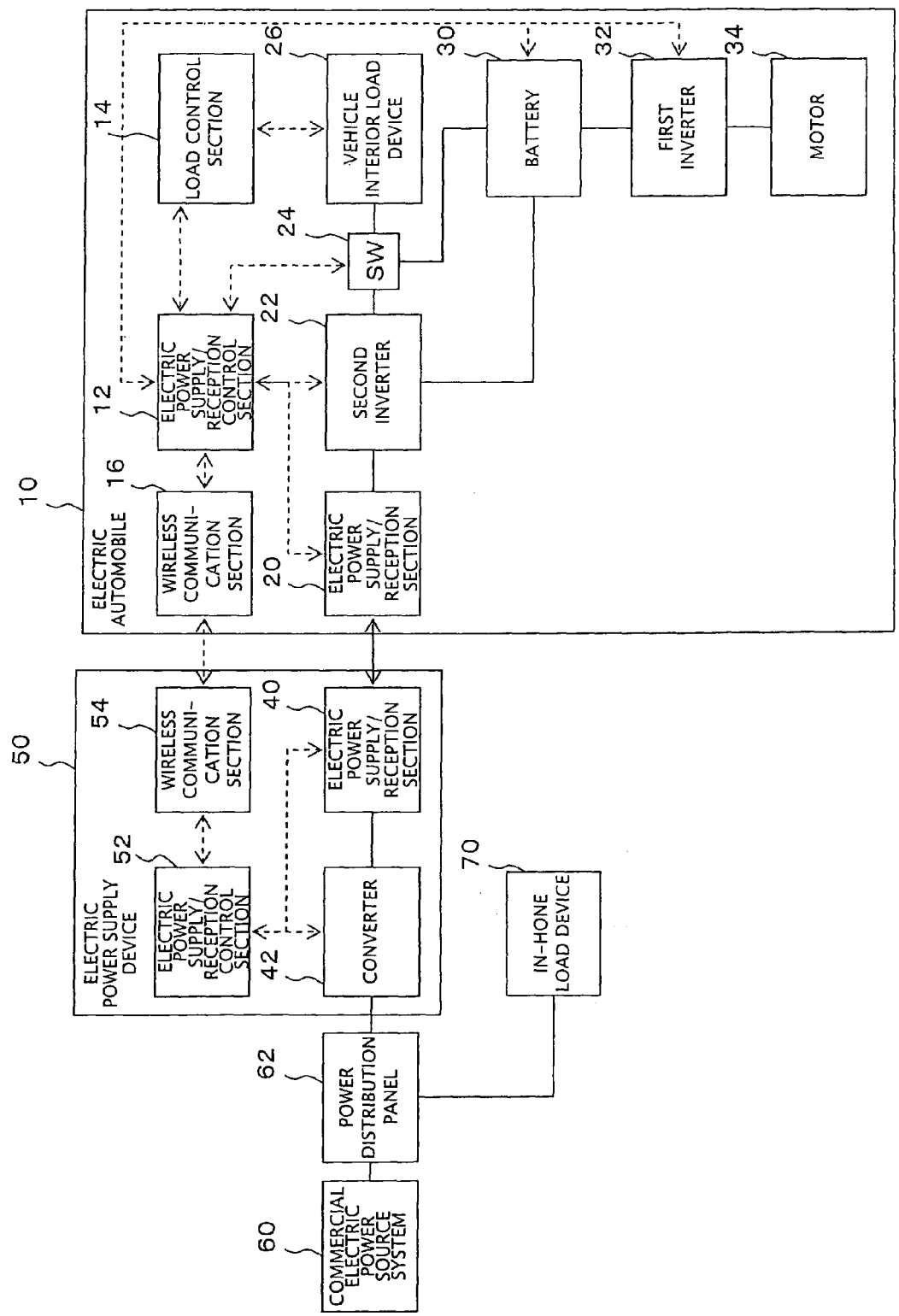
FIG. 1 is a diagram showing functional blocks of the entire system of an embodiment and a variation thereof.

REFERENCE NUMERALS 10 electric automobile
12 electric power supply/reception control section
14 load control section
16 wireless communication section
20 electric power supply/reception section
22 second inverter
24 switch
26 vehicle interior load device
30 battery
32 first inverter
34 motor
40 electric power supply/reception section
42 converter
50 electric power supply device
52 electric power supply/reception control section
54 wireless communication section
60 commercial electric power source system
62 power distribution panel
70 in-home load device

BEST MODE FOR CARRYING OUT THE INVENTION

An embodiment specifically showing the best mode for carrying out the present invention will be described below using the drawings.

FIG. 1 is a diagram showing the functional blocks of the entire system according to the present embodiment. As shown in FIG. 1, the present system includes an electric automobile 10, an electric power supply device 50 which is electrically connected to a battery 30 provided to the electric automobile 10 and charges the battery 30, a commercial electric power source system 60 for supplying electric power from an electric power company to the electric power supply device 50, and an in-home load device 70 which operates by receiving electric power from the commercial electric power source system 60. It should be noted that although description is given using the electric automobile 10 as an example of a vehicle in the present embodiment, the present invention is applicable to any other vehicles such as hybrid electric automobiles and fuel cell automobiles if the vehicles have batteries capable of being charged by outside power sources.

In the present embodiment, the electric automobile 10 operates a vehicle interior load device 26 by means of electric power supplied from the electric power supply device 50 if required, in a state where the electric automobile 10 cannot travel such as a state where the ignition switch is off. In the present embodiment, description is exemplary given for a case where the electric automobile 10 is stopped at a predetermined position near the electric power supply device 50, with the ignition switch being off. However, if the electric automobile 10 is stopped while being electrically connected to the electric power supply device 50, the embodiment described below is applicable even if the ignition switch is on.

Figure 2A:
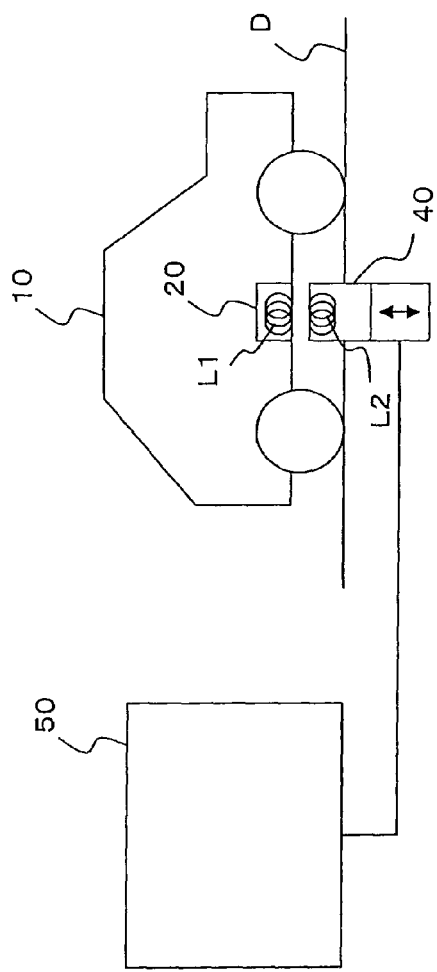
FIG. 2A is a schematic diagram showing an exemplary connection when an electric power supply/reception section of a vehicle side and an electric power supply/reception section of an electric power supply device side are electrically connected by means of an inductive method.
Figure 2B:
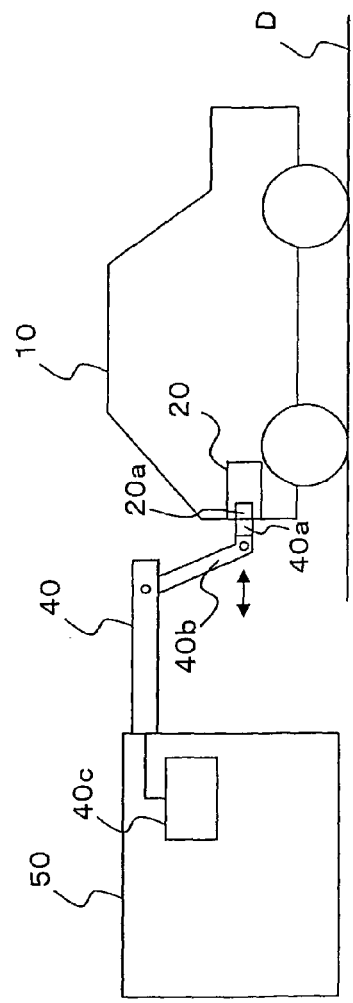
FIG. 2B is a schematic diagram showing an exemplary connection when an electric power supply/reception section of a vehicle side and an electric power supply/reception section of an electric power supply device side are electrically connected by means of a conductive method.

In the present embodiment, the electric automobile 10 and the electric power supply device 50 are electrically connected to each other via the electric power supply/reception sections 20 and 40, and supply and receive electric power. The electrical connection between the electric power supply/reception section 20 on the vehicle side and the electric power supply/reception section 40 on the electric power supply device side is realized by a well-known method such as an inductive method or a conductive method. FIG. 2A is a schematic diagram showing an exemplary connection when the electric power supply/reception section 20 on the vehicle side and the electric power supply/reception section 40 on the electric power supply device side are electrically connected by means of an inductive method. As shown in FIG. 2A, in the case of an inductive method, electric power is supplied and received in a non-contact manner utilizing electromagnetic induction between a coil L1 and a coil L2 provided in the electric power supply/reception section 20 and the electric power supply/reception section 40, respectively. The electric power supply/reception section 40 on the electric power supply device side is movable vertically in an up and down direction with respect to the ground D for example, as shown in FIG. 2A. When electrically connected to the electric power supply/reception section 20 on the vehicle side, the electric power supply/reception section 40 is elevated up to a position where the distance between the coil L1 and the coil L2 enables electromagnetic induction. Meanwhile, FIG. 2B is a schematic diagram showing an exemplary connection when the electric power supply/reception section 20 on the vehicle side and the electric power supply/reception section 40 on the electric power supply device side are electrically connected by means of a conductive method. As shown in FIG. 2B, in the conductive method, electric power is supplied and received by physically connecting a coupler 40a provided in the electric power supply/reception section 40 on the electric power supply device side to a coupler 20a provided in the electric power supply/reception section 20 on the vehicle side. The electric power supply/reception section 40 on the electric power supply device side includes, for example, an arm 40b and a control section 40c which controls the arm, and the tip of the arm 40b is provided with a position sensor (not shown) and the coupler 40a. The control section 40c detects the position of the coupler 20a on the vehicle side using the position sensor, and moves the arm 40b in accordance with positional information from the position sensor, to thereby connect the coupler 40a on the electric power supply device side and the coupler 20a on the vehicle side.

Referring to FIG. 1, the electric automobile 10 includes a battery 30, and a motor 34 which receives electric power from the battery 30 via a first inverter 32 and drives drive wheels. The electric automobile 10 further includes vehicle interior load devices 26 such as an air-conditioning device, a car navigation system, and an auto leveler which automatically adjust the vehicle height. The vehicle interior load devices 26 operate by receiving electric power supplied from the battery 30 via the switch 24 under the control of the load control section 14 even when the ignition switch is off. The switch 24 is further connected to the electric power supply/reception section 20 via a second inverter 22.

The electric power supply/reception control section 12 is configured of a CPU, a ROM, a RAM, and the like, which controls the first inverter 32 and adjusts the amount of electric power output from the battery 30. The electric power output from the first inverter 32 is input to the motor 34, and the motor 34 is driven by the electric power. Further, the electric power supply/reception control section 12 controls the switch 24 to thereby input the electric power from the battery 30 to the vehicle interior load devices 26. Alternatively, the electric power supply/reception control section 12 inputs the electric power output from the electric power supply device 50 to the vehicle interior load devices 26 via a second inverter 22. When the battery 30 is charged with the electric power from the electric power supply device 50 side, the second inverter 22 converts the electric power from high frequency AC to DC. Further, when the electric power from the battery 30 is output to the electric power supply device 50, the second inverter 22 converts the electric power from DC to high frequency AC. It should be noted that the converter 42 is also capable of performing DC/DC conversion, AC/AC conversion, and the like in accordance with the input electric power and the output electric power. The load control section 14 is composed of a CPU, ROM, RAM, and the like, and operates the vehicle interior load device 26 in response to an activation instruction output at a predetermined time by user's operation or timer operation, and performs predetermined control.

A wireless communication section 16 is wirelessly connected to a wireless communication section 54 provided in the electric power supply device 50, and transmits and receives information such as control signals between the electric automobile 10 and the electric power supply device 50.

The electric power supply device 50 is electrically connected to the electric automobile 10 via the electric power supply/reception section 40 and supplies and receives electric power to/from the electric automobile 10, as described above. The electric power supply device 50 is connected to a power distribution panel 62, through which the electric power supply device 50 receives electric power from the commercial electric power source system 60. The electric power from the commercial electric power source system 60 is input to the converter 42 through the power distribution panel 62. When charging the battery 30, the converter 42 converts the electric power from the commercial electric power source system 60 from AC to DC, and then, further converts the DC power to high-frequency AC power. Further, when the converter 42 supplies the electric power from the electric automobile 10 side to the in-home load devices 70 or to the commercial electric power source system 60 through the power distribution panel 62, the converter 42 converts the electric power from the electric automobile 10 side from high-frequency AC to DC power, and then further converts the DC power to AC power. It should be noted that the converter 42 is capable of performing DC/DC conversion, AC/AC conversion, and the like, corresponding to the input electric power and the output electric power.

In the system configured as described above, the processing procedures of the electric power supply/reception control section 12 on the vehicle side and the processing procedures of the electric power supply/reception control section 52 on the home side in the case of operating the vehicle interior load devices when the ignition switch is off will be described below using the flowcharts shown in FIGS. 3A to 3C and FIG. 4.

Figure 3A:
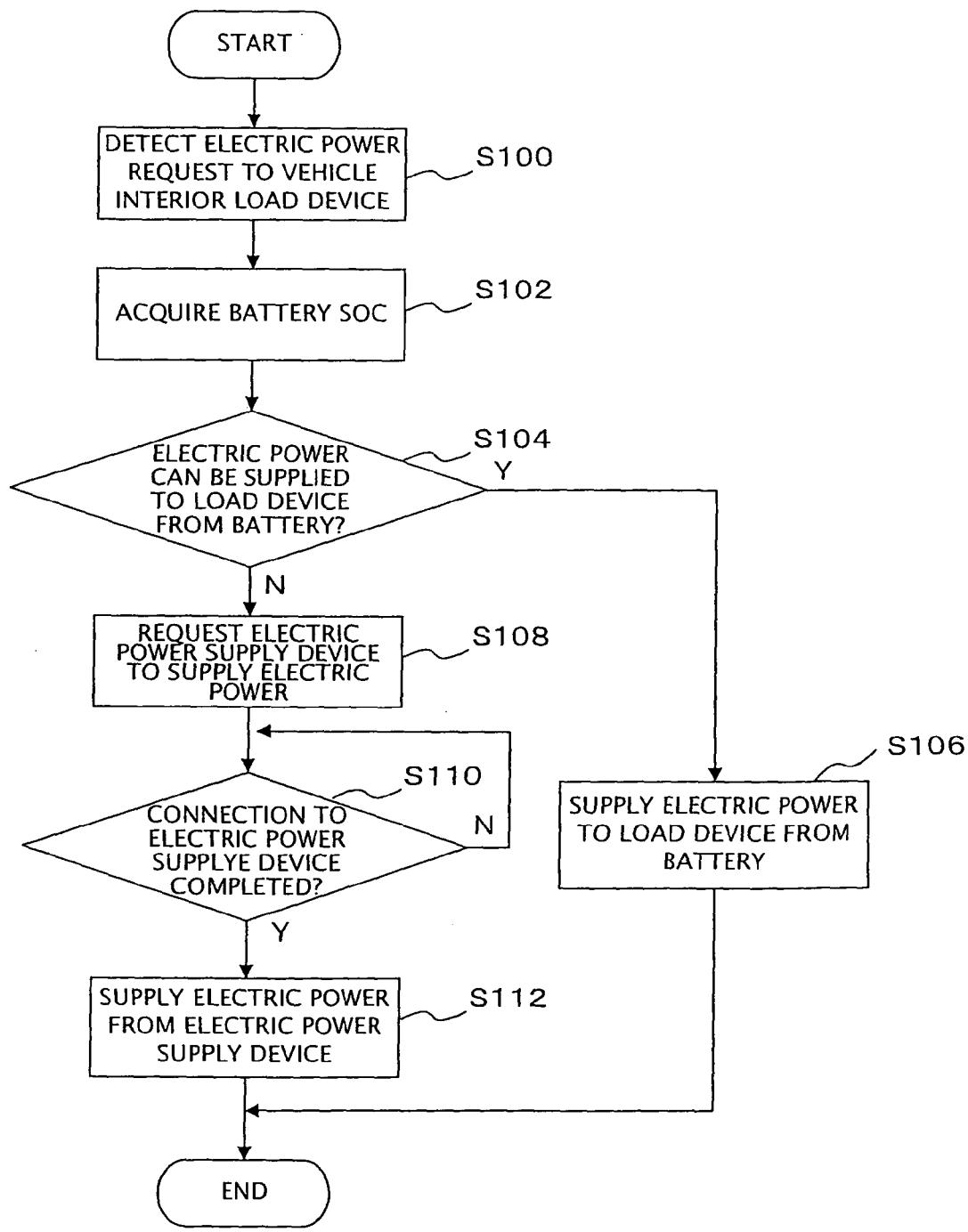
FIG. 3A is a flowchart showing exemplary processing procedures of an electric power supply/reception control section on a vehicle side when an electric power supply request to a vehicle interior load device is detected.

FIG. 3A is a flowchart showing exemplary processing procedures of the electric power supply/reception control section 12 on the vehicle side when an electric power supply request made to the vehicle interior load device 26 is detected.

In FIG. 3A, when the electric power supply/reception control section 12 detects a request, made by the load control section 14, for electric power to be supplied to the vehicle interior load device 26 according to an instruction by a user or at a time based on a predetermined schedule for example (S100), the electric power supply/reception control section 12 first acquires a state of charge (SOC) of the battery 30 (S102). According to the acquired SOC, the electric power supply/reception control section 12 determines whether electric power can be supplied from the battery 30 to the vehicle interior load device 26 (S104).

As a result of the determination, if electric power can be supplied (determination result at step S104 is positive, "Y"), the electric power supply/reception control section 12 supplies the electric power from the battery 30 to the vehicle interior load device 26, and operates the vehicle interior load device 26 (S106).

In contrast, if the charged amount of the battery 30 is insufficient so that electric power cannot be supplied from the battery 30 to the vehicle interior load device 27 (determination result at step S104 is negative, "N"), the electric power supply/reception control section 12 requests the electric power supply device 50 to supply electric power, via the wireless communication section 16 (S108). Then, when the electric power supply/reception section 12 is electrically connected to the electric power supply device 50 via the electric power supply/reception section 20 (determination result at step S110 is positive, "Y"), the electric power supply/reception control section 12 controls the inverter 22, the switch SW and the like so as to allow the electric power from the electric power supply device 50 to be supplied to the vehicle interior load device 26 (S112).

As described above, in the present embodiment, when the vehicle interior load device 26 cannot be operated with use of electric power from the battery 30 in a state where the ignition switch is off, the electric automobile 10 operates the vehicle interior load device 26 using electric power from the electric power supply device 50 by electrically connecting to the electric power supply device 50, if required.

In FIG. 3A, whether or not to supply electric power from the battery 30 to the vehicle interior load device 26 is determined based on the state of charge of the battery 30. However, it is also acceptable to register a vehicle interior load device 26 having large power consumption in a memory beforehand, and when electric power is requested from the registered vehicle interior load device 26 (e.g., air conditioning device), to request electric power from the electric power supply device 50.

Figure 3B:
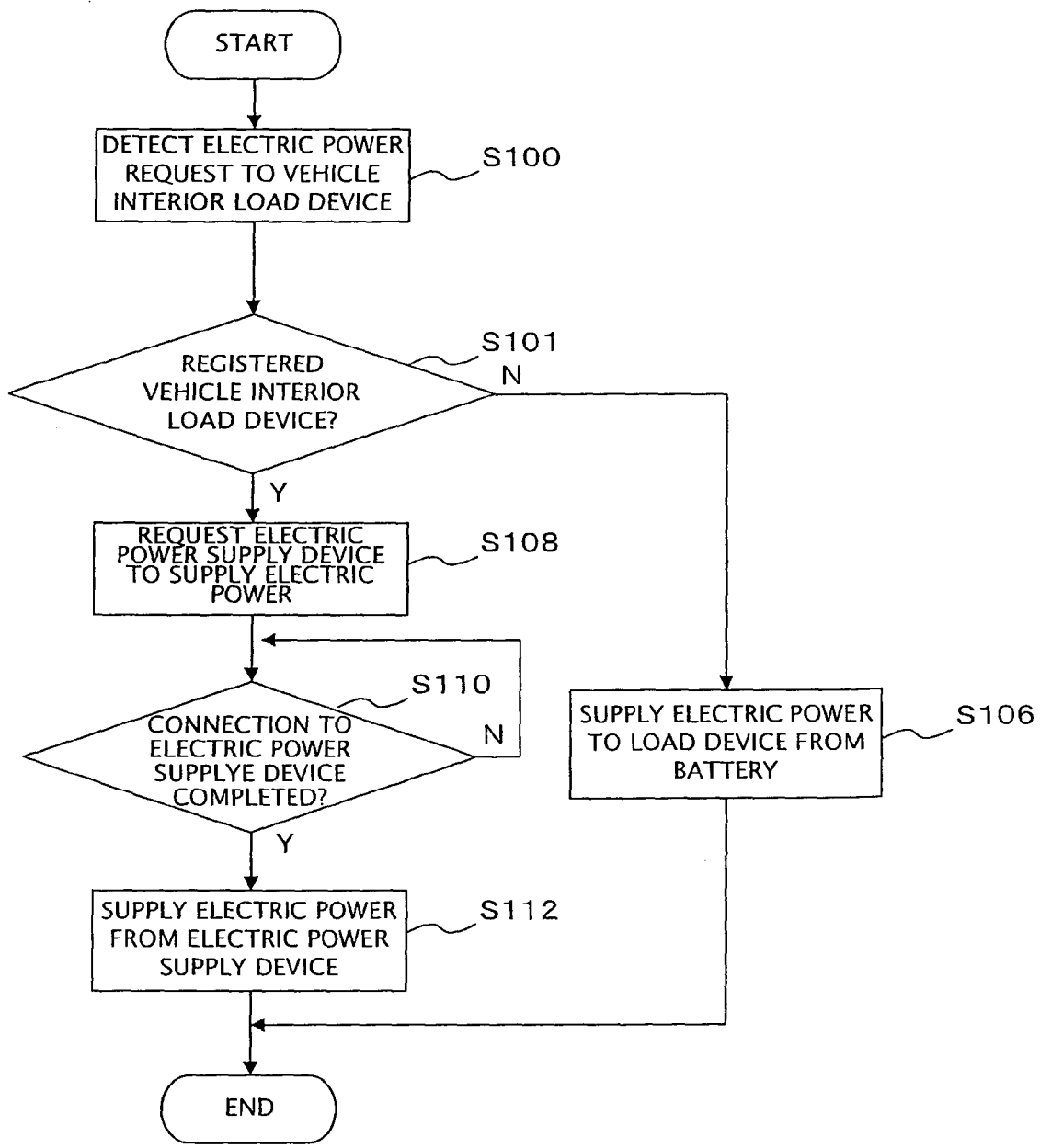
FIG. 3B is a flowchart showing exemplary processing procedures of an electric power supply/reception control section on a vehicle side when an electric power supply request to a vehicle interior load device is detected.

FIG. 3B is a flowchart showing the processing procedures of the electric power supply/reception control section 12 in the case of changing a subject from which electric power supply is requested according to the type of vehicle interior load device 26 requesting electric power.

In FIG. 3B, when the electric power supply/reception control section 12 detects an electric power supply request made from the load control section 14 to the vehicle interior load device 26 according to an instruction by a user or at a time according to a predetermined schedule for example (S100), the electric power supply/reception control section 12 determines whether or not the vehicle interior load device 26 for which electric power supply is requested is a device having been registered in the memory (S101). As a result of determination, if the vehicle interior load device 26 is not a device registered in the memory (determination result at step S101 is negative, "N"), the electric power supply/reception control section 12 determines that the power consumption thereof is relatively small, and so the electric power supply/reception control section 12 supplies electric power from the battery 30 to the vehicle interior load device 26 to thereby operate the vehicle interior load device 26 (S106).

On the other hand, as a result of determination, if the vehicle interior load device 26 is a device registered in the memory (determination result at step S101 is positive, "Y"), the electric power supply/reception control section 12 determines that the power consumption thereof is relatively large, so that the electric power supply/reception control section 12 requests the electric power supply device 50 to supply electric power, via the wireless communication section 16 (S108). Thereafter, the electric power supply/reception control section 12 performs the processes of steps S110 to S112 in the same manner as the processes of FIG. 3A.

As described above, it is also acceptable that the electric power supply/reception control section 12 registers the vehicle interior load device 26 having large power consumption in the memory beforehand, and when electric power is requested by the registered vehicle interior load device 26, the electric power supply/reception control section 12 requests electric power from the electric power supply device 50.

Figure 3C:
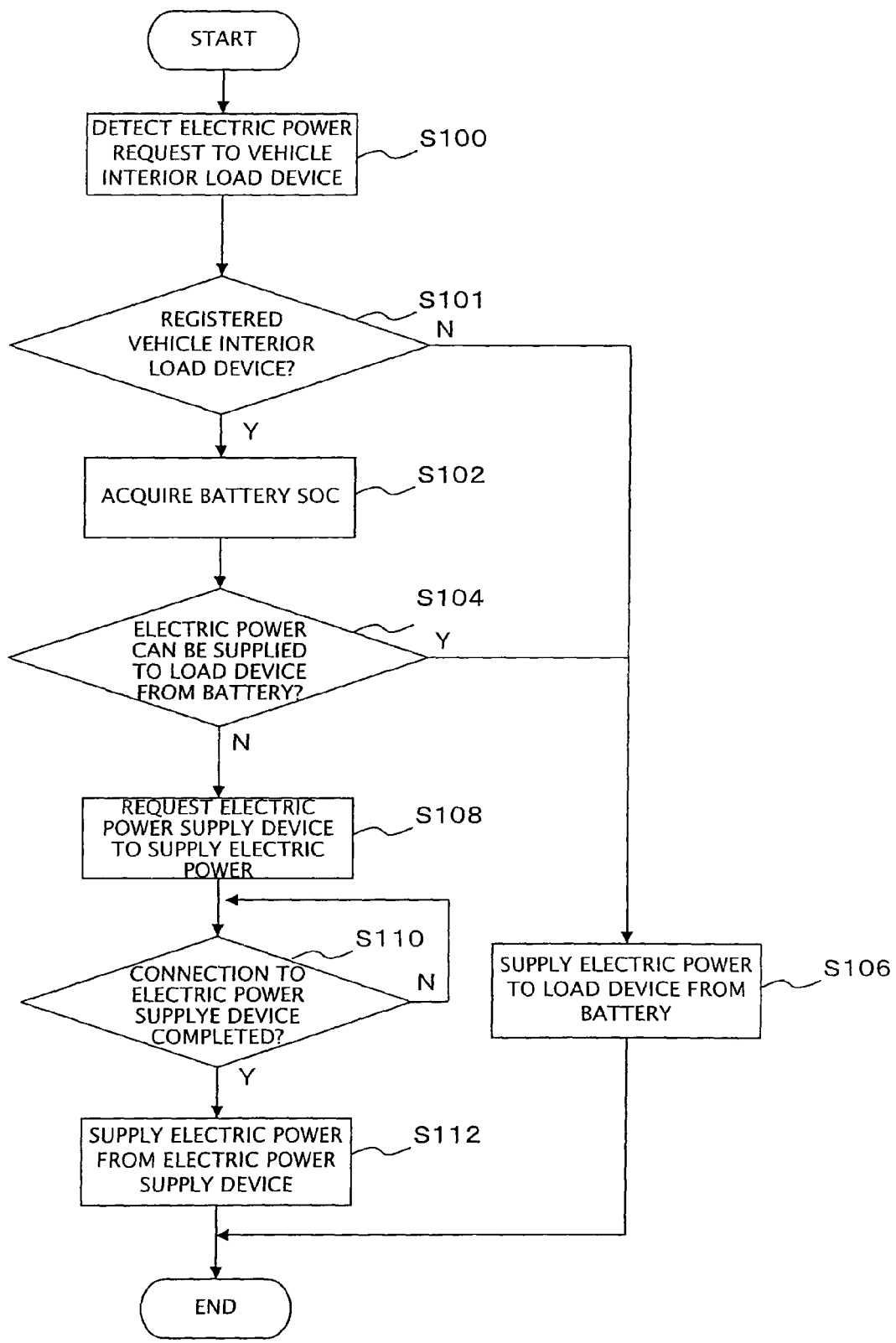
FIG. 3C is a flowchart showing exemplary processing procedures of an electric power supply/reception control section on a vehicle side when an electric power supply request to a vehicle interior load device is detected.

It should be noted that even in the case of an electric power request from the registered vehicle interior load device 26, the electric power supply/reception control section 12 may determine whether or not electric power can be supplied from the battery 30 before requesting the electric power supply device 50 to supply electric power, as shown in steps S102 to S104 of FIG. 3C.

Further, when the electric power supply/reception control section 12 acquires the SOC of the battery 30 at step S102, the electric power supply/reception control section 12 may determine whether or not the SOC of the battery is smaller than a predetermined threshold at which the battery 30 needs to be charged. As a result of determination, if the SOC of the battery 30 is smaller than the predetermined threshold, the electric power supply/reception control section 12 may request the electric power supply device 50 to supply electric power, and when connection to the electric power supply device 50 has been completed, charge the battery 30 with the electric power from the electric power supply device 50. Further, the electric power supply/reception control section 12 may also charge the battery 30 in parallel with supplying electric power to the vehicle interior load device 26 using electric power from the electric power supply device 50.

Figure 4:
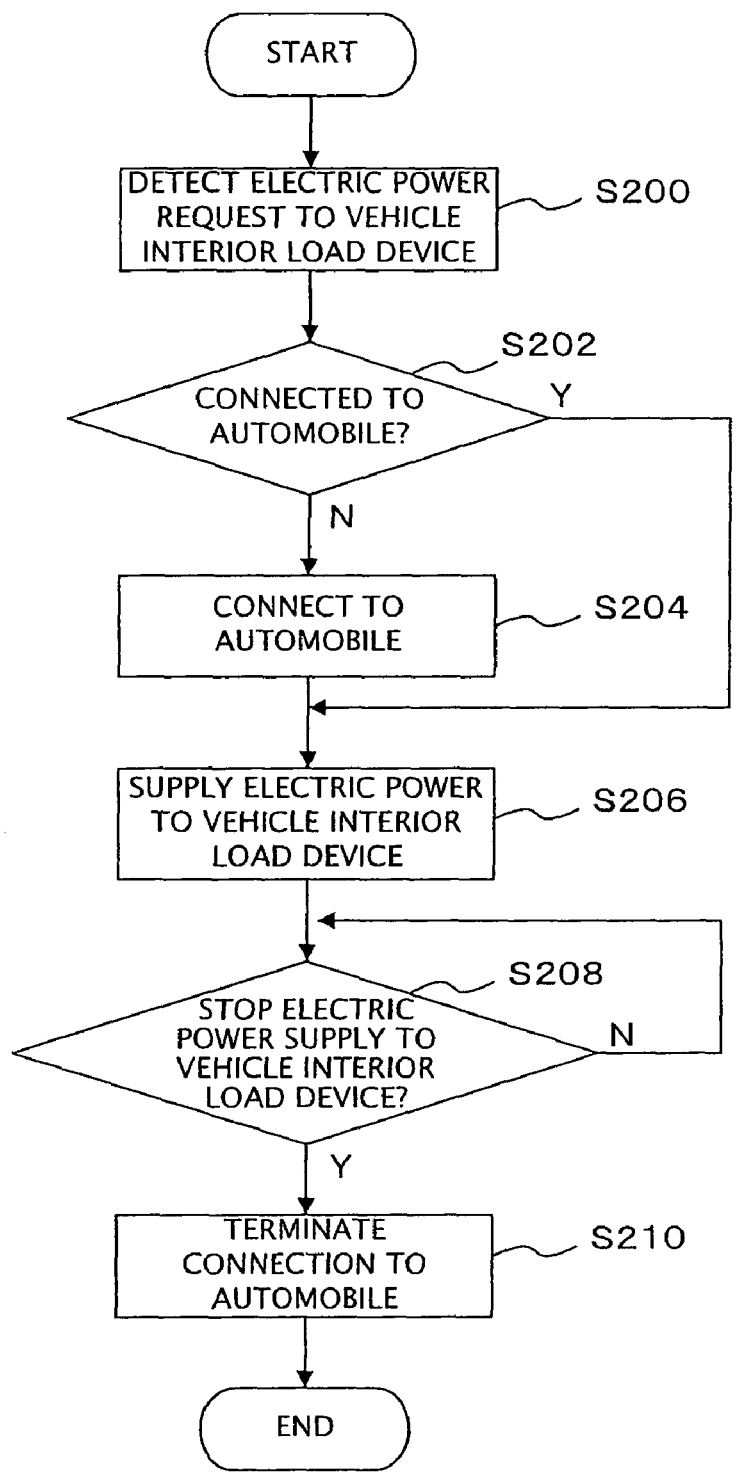
FIG. 4 is a flowchart showing processing procedures of an electric power supply/reception control section on a home side when an electric power supply request is received from an electric automobile.

FIG. 4 is a flowchart showing the processing procedures of the electric power supply/reception control section 52 on the home side when an electric power supply request is made by the electric automobile 10.

In FIG. 4, when the electric power supply/reception control section 52 detects an electric power supply request from the electric automobile 10 via the wireless communication section 54 (S200), if the electric power supply/reception control section 52 is not connected to the electric automobile 10 (determination result at step S202 is negative, "N"), the electric power supply/reception control section 52 connects to the electric automobile 10 (S204). That is, the electric power supply/reception control section 52 electrically connects to the electric automobile 10 via the electric power supply/reception section 40. Then, the electric power supply/reception control section 52 supplies electric power received from the commercial electric power source system 60 to the vehicle interior load device 26 via the electric power supply/reception section 40 (S206). It should be noted that if the request from the electric automobile 10 is to charge the battery 30, the electric power supply/reception control section 52 supplies electric power received from the commercial electric power source system 60 to the battery 30 via the electric power supply/reception section 40. Then, when the electric power supply/reception control section 52 receives an instruction to stop supplying electric power from the electric automobile 10 (determination result at step S208 is positive, "Y"), the electric power supply/reception control section 52 terminates the connection to the electric automobile 10 (S210).

Next, a modification of the present embodiment will be described using the drawings.

In the present modification, electric power from the battery 30 provided to the electric automobile 10 is supplied to the in-home load device 70 upon request from the electric power supply device 50.

Hereinafter, the processing procedures of the electric power supply/reception control section 52 on the home side and the processing procedures of the electric power supply/reception control section 12 on the vehicle side will be described using the flowcharts shown in FIGS. 5 and 6.

Figure 5:
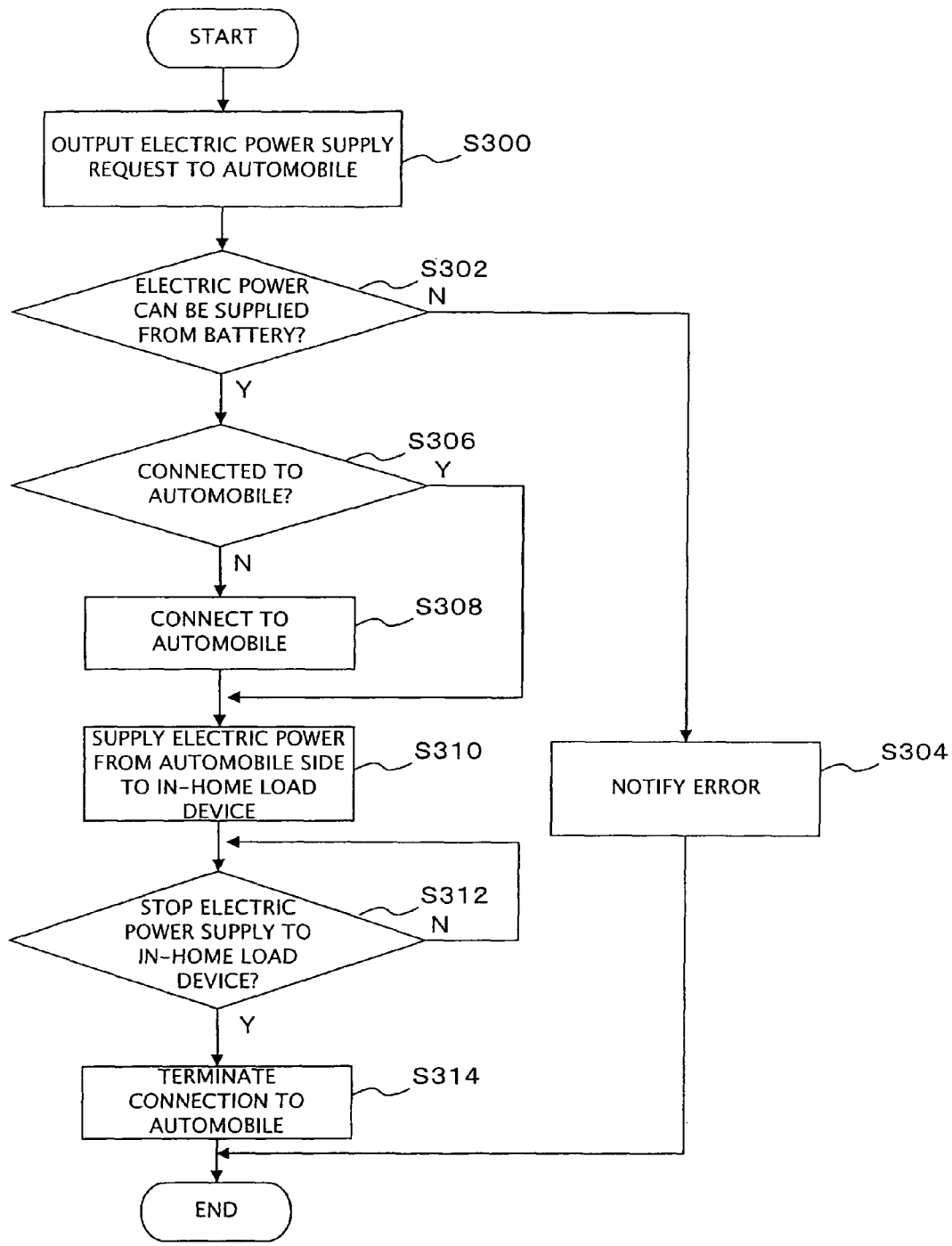
FIG. 5 is a flowchart showing processing procedures of an electric power supply/reception control section on a home side when a request for electric power is made to an electric automobile.

FIG. 5 is a flowchart showing the processing procedures of the electric power supply/reception control section 52 on the home side in the case of requesting electric power from the electric automobile 10.

In FIG. 5, when the electric power supply/reception control section 52 supplies electric power received from the electric automobile 10 to the in-home load device 70 according to a user's instruction or the like, the electric power supply/reception control section 52 outputs an electric power supply request indicating the amount of electric power requested to the electric automobile 10 for example, via the wireless communication section 54 (S300). In response to the electric power supply request, the electric power supply/reception control section 52 acquires information, from the electric automobile 10, indicating whether or not electric power can be supplied from the battery 30 as described below. The electric power supply/reception control section 52 refers to the information, and if electric power cannot be supplied from the battery 30 (determination result at step S302 is negative, "N"), notifies the user of an error (S304).

In contrast, if electric power can be supplied from the battery 30 (determination result at step S302 is positive, "Y"), the electric power supply/reception control section 52 determines whether it is electrically connected to the electric automobile (S306), and if it is not connected, the electric power supply/reception control section 52 connects to the electric automobile 10 (S308). That is, the electric power supply/reception control section 52 connects to the electric automobile 10 via the electric power supply/reception section 40. Then, the electric power supply/reception control section 52 supplies electric power from the battery 30 to the in-home load device 70 through the electric power supply/reception section 40 and the converter 42 (S310). Further, when the electric power supply/reception control section 52 receives an instruction to stop supplying electric power to the in-home load device 70 by means of a user's instruction or the like (determination result at step S312 is positive, "Y"), the electric power supply/reception control section 52 terminates the connection to the electric automobile 10 (S314).

Figure 6:
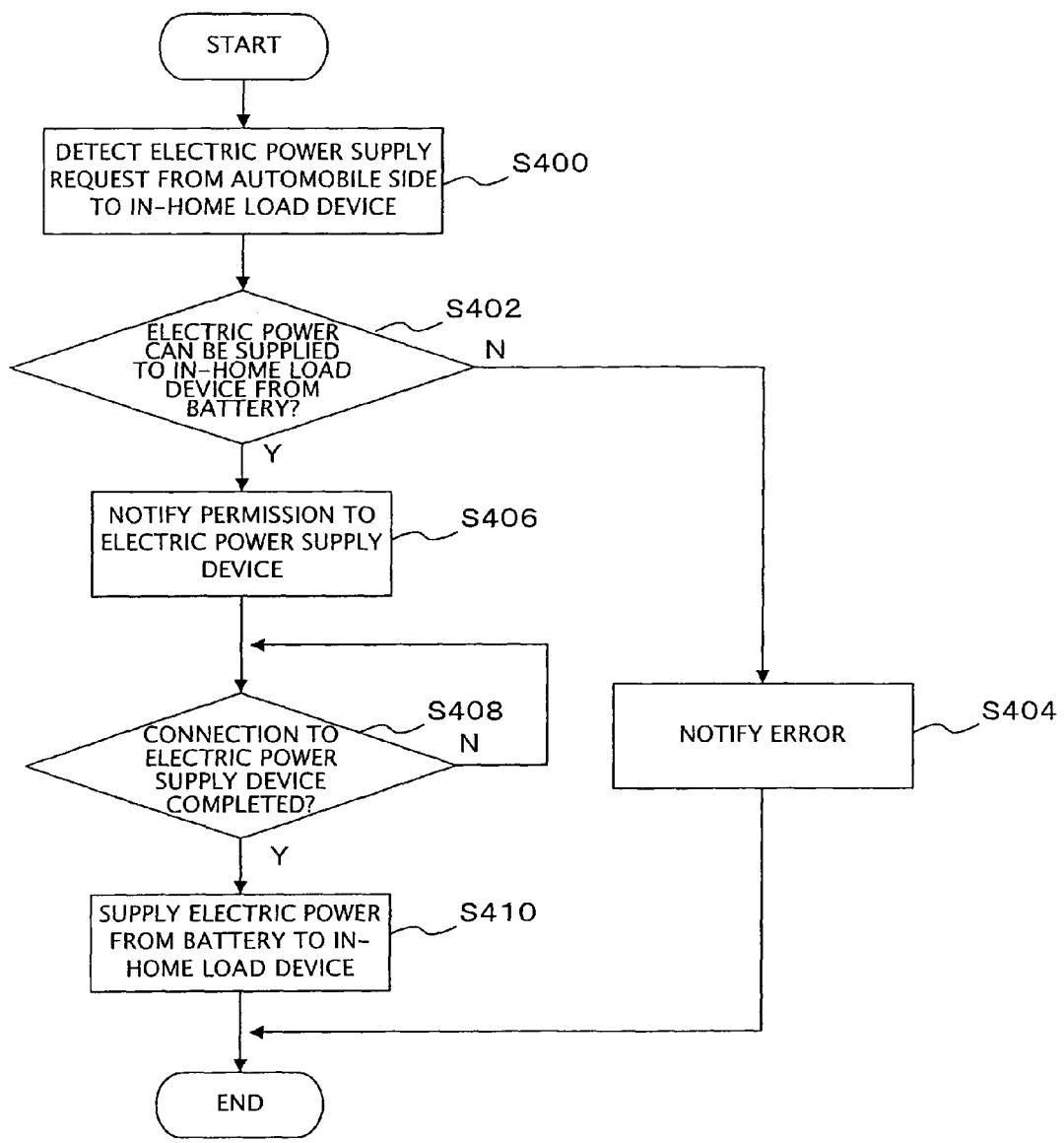
FIG. 6 is a flowchart showing processing procedures of an electric power supply/reception control section on the vehicle side when a request for electric power is made to an electric automobile.

FIG. 6 is a flowchart showing the processing procedures of the electric power supply/reception control section 12 on the vehicle side when making a request to the electric automobile 10 for electric power.

In FIG. 6, when the electric power supply/reception control section 12 detects an electric power supply request from the electric power supply device 50 via the wireless communication section 16 (S400), the electric power supply/reception control section 12 determines whether or not electric power can be supplied from the battery 30 to the in-home load device 70, according to the SOC of the battery 30 and the amount of electric power requested by the electric power supply device 50 (S402). As a result of determination, if electric power cannot be supplied (determination result at step S402 is negative, "N"), the electric power supply/reception control section 12 notifies the electric power supply device 50 of an error (S404).

In contrast, if electric power can be supplied (determination result at step S402 is positive, "Y"), the electric power supply/reception control section 12 outputs a permission notification indicating that electric power can be supplied to the electric power supply device 50, via the wireless communication section 16 (S406). Then, when electric connection to the electric power supply device 50 is completed (determination result at step S408 is positive, "Y"), the electric power supply/reception control section 12 outputs electric power from the battery 30 to the electric power supply device 50 via the inverter 22 and the electric power supply/reception section 20, and supplies the electric power from the battery 30 to the in-home load device 70 (S410).

As described above, according to the present modification, when the electric power supply/reception control section 52 receives a request for supplying electric power from the electric automobile 10 to the in-home load device 70, and if electric power can be supplied from the battery 30, the electric power supply/reception control section 52 electrically connects to the electric automobile 10 and receives electric power from the battery 30.

In the above modification, although an example of supplying electric power from the battery 30 provided to the electric automobile 10 to the in-home load device 70 has been described, electric power from the battery 30 may be supplied to electrical apparatuses other than the in-home load device 70, such as those used outside (e.g., campsite). Further, electric power from the battery 30 may also be supplied to the commercial electric power source system 60. In other words, electric power from the battery 30 may be caused to flow in reverse to the commercial electric power source system 60 according to a request from the electric power supply device 50.

In the case where electric power from the battery 30 is supplied to electric apparatuses provided outside or is made to flow in reverse to the commercial electric power source system 60, the processing procedures of the electric power supply/reception control section 52 on the home side and the electric power supply/reception control section 12 on the vehicle side can be understood by referring to the flowcharts of FIGS. 5 and 6 while replacing the "in-home load device" with an "outside electric apparatus" or a "commercial electric power source system".

Further, as a trigger for terminating electrical connection between the electric automobile 10 and the electric power supply device 50, description has been given for the case where electric power supply to the load device is terminated according to an instruction from the user or the like, as shown in step S208 in FIG. 4 and step S312 in FIG. 5. However, there is a case where electric power cannot be supplied to the vehicle interior load device or the in-home load device due to an error in a state where the electric automobile 10 and the electric power supply device 50 are electrically connected. In that case, the electric power supply/reception control section 52 on the home side may terminate the electrical connection between the electric automobile 10 and the electric power supply device 50 upon receiving an error notification from the vehicle interior load device or the in-home load device.

The invention claimed is:

1. A vehicle including a battery, and a vehicle interior load device which operates using electrical power from the battery, the vehicle comprising:
    an electric power requesting section which makes a request to an electrical power supply device that charges the battery using electric power from a commercial electric power source system for supplying electric power to the vehicle interior load device, in accordance with a demand for supplying electric power to the vehicle interior load device when the vehicle is at a standstill; and
    an electric power reception section which receives electric power to the vehicle interior load device supplied in accordance with the request, from the electric power supply device, wherein
    if the vehicle interior load device for which supply of electric power is demanded is a particular vehicle interior load device, the electric power supply requesting section requests the electric power supply device to supply electric power to the vehicle interior load device even when an ignition switch of the vehicle is off, and if the vehicle interior load device is not a particular vehicle interior load device, the electric power supply requesting section requests a control section which controls charging and discharging of the battery to supply electric power from the battery to the vehicle interior load device even when the ignition switch is off.

* * * * *